March 23, 1926.
Re. 16,295
S. G. DOWN
FLUID PRESSURE BRAKE
Original Filed Dec. 27, 1921
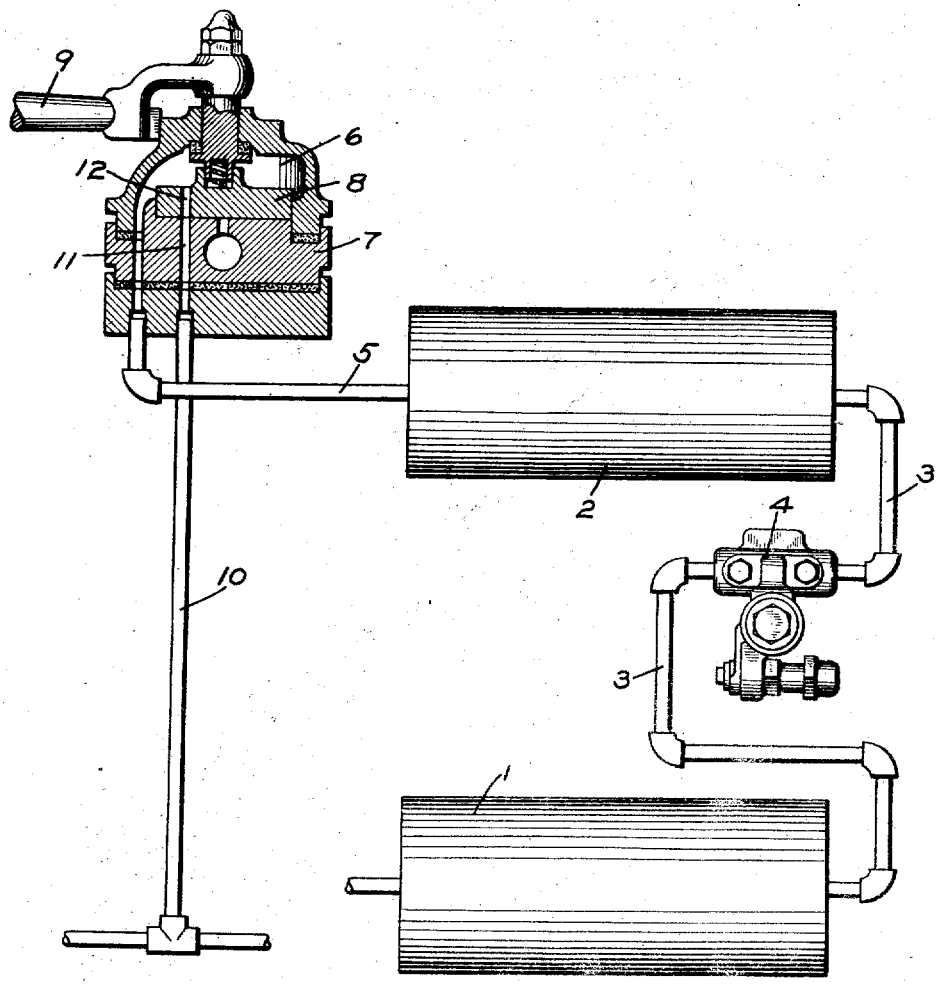
INVENTOR
SIDNEY G. DOWN
BY Wm. M. Cady
ATTORNEY Reissued Mar. 23, 1926. Re. 16,295

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Original No. 1,488,479, dated April 1, 1924, Serial No. 524,926, filed December 27, 1921. Application for reissue filed November 6, 1925. Serial No. 67,464.

*To all whom it may concern:*

Be it known that I, SIDNEY G. DOWN, a citizen of the United States, residing at Pittsburgh, in the county of Allegheny and State of Pennsylvania, have invented new and useful Improvements in Fluid-Pressure Brakes, of which the following is a specification.

This invention relates to fluid pressure brakes, and more particularly to the locomotive brake equipment.

With the usual standard locomotive brake equipment, the brake valve device is provided with a full release position, in which fluid under pressure is supplied directly from the main reservoir to the brake pipe, and a running position, in which fluid is supplied from the main reservoir through a feed valve device to the brake pipe, at a limited rate and at the pressure normally to be maintained in the brake pipe.

In operation, the brake valve handle is normally left in running position while the brakes remain released and it has been found that in some instances, when the brake pipe pressure is reduced by leakage, the feed valve device will sometimes fail to supply fluid to the brake pipe to compensate for the leakage at a rate sufficient to prevent movement of one or more triples to application position.

One object of my invention is to provide a locomotive brake equipment having means for obviating the above difficulty.

With the usual standard locomotive brake equipment, where the feed valve device is placed between the main reservoir volume and the brake valve device, the engineer, in releasing the brakes, must manipulate the brake valve handle between release and running positions, and under certain conditions of train lengths and brake operation he is called upon to move the brake valve handle several times between running and release positions, to release such brakes as may have applied, due to the rapid fall of pressure in the brake pipe as occasioned by leakage from the brake pipe and also by the equalization of pressure from the head to the rear end of long trains.

Another object of my invention is to simplify the operation of releasing the brakes by providing a locomotive brake equipment in which the release of the brakes may be satisfactorily controlled by the movement of the brake valve handle to one position instead of two.

It has been proposed to provide a locomotive brake equipment wherein no feed valve device is employed but in which the release of the brakes is controlled by the movement of the brake valve handle to one position instead of two, but in this case, the full volume of storage air on the locomotive is directly connected and has an unobstructed flow to the brake pipe, which tends to result in the overcharging of the brake system including the auxiliary reservoirs.

Furthermore, with no feed valve device between the reservoir volume and the brake pipe, no excess pressure will be available for insuring the prompt release of the brakes and the recharging of the brake system, it being necessary to depend entirely upon the operation of the compressor to provide the excess pressure for this purpose, which in many cases requires considerable time and even then does not provide the volume of air necessary to effect the release of the brakes and the recharge of the brake system with the desired facility.

It may also be noted that with no feed valve device between the storage reservoir and the brake system, there is no provision of a body of air remaining stationary long enough to permit cooling and precipitation of moisture as would be the case where the connection between the reservoirs and the brake system is interrupted.

In order to accomplish the objects of my invention as above enumerated, I utilize the two main reservoirs of the standard locomotive brake equipment and interpose in the connection beween the two reservoirs a feed valve device, so that one reservoir contains fluid at the pressure compressed by the pump, while the other reservoir is supplied through the feed valve device with fluid at a reduced pressure.

In the accompanying drawing, the single figure is a diagrammatic view of so much of a locomotive brake equipment as it deemed necessary to illustrate the application of my invention.

As shown in the drawing, main reservoirs 1 and 2 are provided on the locomotive, the reservoir 1 being connected to the pump or compressor (not shown) and having a pipe connection 3, containing a feed valve device 4 of the usual construction, and through which fluid under pressure is supplied to the main reservoir 2. The main reservoir 2 is connected by pipe 5 with the valve chamber 6 of the brake valve device 7 comprising the usual casing with the rotary slide valve 8 contained in valve chamber 6 and adapted to be operated by the handle 9. The usual brake pipe 10 is connected to a port 11 leading to the seat of the valve 8.

In operation, the main reservoir 1 is charged with fluid under pressure by operation of the usual compressor, and fluid flows through pipe 3 and the feed valve device 4, charging the main reservoir 2 at a reduced pressure normally carried in the brake system and according to the adjustment of the feed valve device.

To release the brakes after the brakes have been applied, the brake valve handle 9 is turned to release position, as shown in the drawing, in which a port 12, through the rotary valve 8, connects the valve chamber 6 with the brake pipe port 11. Fluid under pressure is then supplied through an unobstructed passage of large capacity directly from the reservoir 2 to the brake pipe 10 at such a rate as to ensure the prompt movement of the triple valve devices throughout the train to release position and in sufficient volume to provide for the prompt recharge of the auxiliary reservoirs. The brake valve handle is then left in the release position without the necessity of moving the handle to a running position, and should leakage occur from the brake pipe the pressure in the brake pipe will be adequately maintained to prevent the possible reapplication of one or more brakes in the train by a reduction in brake pipe pressure at a greater rate than fluid can flow from the auxiliary reservoir through the usual feed groove around the triple valve piston to the brake pipe.

At the same time, the reservoir 1 holds in storage a large volume of air at a high pressure which facilitates cooling and the precipitation of moisture.

Having now described my invention, what I claim as new and desire to secure by Letters Patent, is:—

1. In a locomotive brake equipment, the combination with a primary reservoir adapted to be charged with fluid under pressure, a secondary reservoir, and a reducing valve device through which fluid under pressure is supplied at a reduced pressure from the primary reservoir to the secondary reservoir, of a brake pipe and a brake valve device having only one position in which fluid under pressure can be supplied to the brake pipe, said supply being only from said secondary reservoir.

2. In a locomotive brake, the combination with a reservoir charged only at the pressure of fluid normally carried in the brake system, of a brake pipe and a brake valve device having only one position in which fluid under pressure can be supplied to the brake pipe, said supply of fluid to the brake pipe being only from said reservoir.

3. The combination with a brake pipe, of a reservoir charged only at a pressure not exceeding the pressure normally carried in the brake pipe, a brake valve device having a valve chamber connected at all times to said reservoir and a manually operable valve in said chamber having a position in which fluid under pressure is supplied from said valve chamber to said brake pipe.

4. The combination with a brake pipe, of a pressure reducing valve device for supplying fluid at the normal pressure carried in the brake pipe, a reservoir chargeable with fluid under pressure only through said reducing valve device, a brake valve having a valve chamber supplied with fluid under pressure only from said reservoir and a manually operable valve in said chamber having a position in which fluid under pressure is supplied from said valve chamber to the brake pipe.

In testimony whereof I have hereunto set my hand.

SIDNEY G. DOWN.